United States Patent
Kimura et al.

(10) Patent No.: US 11,578,963 B2
(45) Date of Patent: Feb. 14, 2023

(54) OPTICAL INTERFERENCE MEASUREMENT APPARATUS

(71) Applicant: OMRON Corporation, Kyoto (JP)

(72) Inventors: Kazuya Kimura, Kizugawa (JP); Masayuki Hayakawa, Kizugawa (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/174,377

(22) Filed: Feb. 12, 2021

(65) Prior Publication Data
US 2021/0285755 A1    Sep. 16, 2021

(30) Foreign Application Priority Data

Mar. 13, 2020    (JP) .............................. JP2020-044217

(51) Int. Cl.
*G01B 9/02001*    (2022.01)
*G01B 9/02003*    (2022.01)
(Continued)

(52) U.S. Cl.
CPC ..... *G01B 9/02007* (2013.01); *G01B 9/02003* (2013.01); *G01B 9/0209* (2013.01); *G01S 17/34* (2020.01)

(58) Field of Classification Search
CPC ............ G01B 9/02004; G01B 9/02007; G01B 9/02057; G01B 9/0209; G01B 9/02091
See application file for complete search history.

(56) References Cited

U.S. PATENT DOCUMENTS

| 6,485,413 B1 * | 11/2002 | Boppart | ............. | A61B 1/00096 |
| | | | | 356/450 |
| 2013/0271772 A1* | 10/2013 | Johnson | ............. | G01B 9/02091 |
| | | | | 356/479 |

(Continued)

FOREIGN PATENT DOCUMENTS

| CN | 110720022 A | 1/2020 |
| EP | 3401634 A1 | 11/2018 |

(Continued)

OTHER PUBLICATIONS

Extended European search report (EESR) dated Jun. 30, 2021 in a counterpart European patent application.
(Continued)

*Primary Examiner* — Michael A Lyons
(74) *Attorney, Agent, or Firm* — Metrolex IP Law Group, PLLC

(57) ABSTRACT

A first light source outputs measurement light having a wavelength in infrared range. A second light source outputs guide light having a wavelength in visible range. A fiber coupler includes a first port into which the measurement light is input, a second port into which the guide light is input, and a third port outputting combined light formed by combining the measurement light and the guide light with each other. A measurement unit emits the combined light to a measurement object and receives return light reflected therefrom. A processing unit obtains information relating to a distance, a speed, or an oscillation of the measurement object, based on an interference signal of the return light and the reference light. The fiber coupler is formed by a single mode fiber that has a cutoff wavelength that is shorter than that of the measurement light and longer than that of the guide light.

18 Claims, 10 Drawing Sheets

(51) Int. Cl.
*G01B 9/0209* (2022.01)
*G01S 17/34* (2020.01)

(56) References Cited

U.S. PATENT DOCUMENTS

| | | |
|---|---|---|
| 2014/0171807 A1 | 6/2014 | Akkin et al. |
| 2015/0109622 A1* | 4/2015 | Ota ................... G01B 9/02004 356/479 |
| 2015/0241202 A1* | 8/2015 | Jiang ................. G01B 9/02083 356/479 |
| 2016/0367134 A1 | 12/2016 | Su |
| 2018/0224548 A1 | 8/2018 | Hariyama et al. |
| 2020/0116471 A1 | 4/2020 | Takaya et al. |
| 2020/0200523 A1* | 6/2020 | Am Weg ............ G01B 9/02024 |
| 2021/0267801 A1* | 9/2021 | Akiyama ............... G16H 15/00 |

FOREIGN PATENT DOCUMENTS

| | | |
|---|---|---|
| WO | 99/57507 A1 | 11/1999 |
| WO | 2017187510 A1 | 11/2017 |

OTHER PUBLICATIONS

Yang C et al., "A multi-point laser Doppler vibrometer with fiber-based configuration", Review of Scientific Instruments, Dec. 18, 2013, vol. 84, No. 12, AIP Publishing, Melville, NY, US; Relevance is indicated in the EESR issued on Jun. 30, 2021.

The Office Action (CNOA) dated Nov. 30, 2022 in a counterpart Chinese patent application.

* cited by examiner

OPTICAL INTERFERENCE MEASUREMENT APPARATUS

CROSS-REFERENCES TO RELATED APPLICATIONS

This application claims priority to Japanese Patent Application No. 2020-044217 filed Mar. 13, 2020, the entire contents of which are incorporated herein by reference.

FIELD

The disclosure relates to a ranging technique using optical interference.

BACKGROUND

A technique is known in which a measurement object is irradiated with coherent measurement light, and a distance, a speed, an oscillation, and the like are measured based on interference signals of reflected light (return light) and reference light (see WO 2017/187510). In the above described kind of optical interference measurement apparatus, invisible light such as infrared laser light is typically used.

WO 2017/187510 is an example of background art.

There is a strong demand for FA (Factory Automation) sensors with which a measurement position, that is, a position of the measurement object that is irradiated with measurement light can be visually confirmed. To this end, in developing an optical interference measurement apparatus for FA applications, the inventors have investigated adding a function for irradiating a measurement position with guide light for visually indicating the measurement position, separately from the measurement light.

Methods for implementing the guide light irradiation function may include a configuration in which an irradiation optical system of the guide light is provided separately from an irradiation optical system of the measurement light, and a configuration in which the measurement light and the guide light are combined with each other, and the measurement object is irradiated with the resultant light from a common irradiation optical system. However, the former configuration has a problem in that alignment of optical axes of the two irradiation optical systems is difficult and such a configuration incurs an increase in size of a measurement head. On the other hand, in the latter configuration, a WDM (Wavelength Division Multiplexing) coupler that is usually used as a means for multiplexing lights having different wavelengths is expensive and difficult to adopt. In addition, a method using a dichroic mirror is conceivable, but there is a problem in that such a method incurs an increase in the number of components and size of the apparatus body.

SUMMARY

An optical interference measurement apparatus according to one or more embodiments may provide a guide light irradiation function of an optical interference measurement apparatus at low cost without incurring an increase in size of the apparatus.

An optical interference measurement apparatus according to one or more embodiments may include a first light source that outputs measurement light that has a wavelength in an infrared range, a second light source that outputs guide light that has a wavelength in a visible range, a fiber coupler that includes at least a first port into which the measurement light is input, a second port into which the guide light is input, and a third port that outputs combined light formed by combining the measurement light and the guide light with each other, a measurement unit that emits the combined light to a measurement object and to receive return light that is reflected from the measurement object, and a processing unit that obtains information relating to a distance, a speed, or an oscillation the measurement object, based on an interference signal of the return light and the reference light, wherein the fiber coupler is formed by a single mode fiber that has a cutoff wavelength that is shorter than the wavelength of the measurement light and longer than the wavelength of the guide light.

With the above described configuration, since the same position is irradiated with the measurement light and the guide light, due to a spot (light spot) that appears on the surface of the measurement object, the measurement position (position irradiated with the measurement light) can be visually confirmed. Furthermore, by using the fiber coupler that is formed by a single mode fiber that has a cutoff wavelength that is shorter than the wavelength of the measurement light and longer than the wavelength of the guide light, a means for synthesizing the measurement light and the guide light can be realized at low cost, and the apparatus body and the measurement unit can be easily made smaller.

It is preferable that a coupling ratio of a path from the first port to the third port of the fiber coupler is at least 50%. By increasing the ratio of the measurement light that is guided to the measurement unit, the power of the measurement light that is projected on the measurement object can be stronger, and measurement accuracy can be improved.

It may be preferable that the first light source is a wavelength swept light source. With the above described configuration, an interferometer using an FMCW can be simply realized.

The guide light may also be red light because the closer the wavelength of the measurement light (infrared light) is to that of the guide light, the smaller the influence of chromatic aberration on the optical system of the measurement unit is.

The measurement unit may also include an optical system in which chromatic aberration is corrected. With the above described configuration, displacement between the position on which the measurement light is projected and the position on which the guide light is projected due to the chromatic aberration can be decreased as much as possible.

The reference light may also be part of the combined light that is reflected from a reference surface provided on an optical path between the third port of the fiber coupler and the measurement unit. With the above described configuration, since the optical paths of the reference light and the measurement light (return light) can be the same, robustness against temperature changes and oscillations can be improved.

The reference surface may also be an end face of an optical fiber that is connected to the measurement unit. With the above described, the configuration can be simplified and made smaller.

The reference light may also be light obtained by branching part of the measurement light by a branching device provided on an optical path between the first light source and the first port of the fiber coupler. Alternatively, the reference light may also be light obtained by branching part of the combined light by a branching device provided on the optical path between the third port of the fiber coupler and the measurement unit. Alternatively, the fiber coupler may also include a fourth port from which the combined light is output, and the reference light may also be light output from the fourth port.

One or more embodiments may be implemented as an optical interference measurement apparatus, a distance measurement apparatus, a ranging sensor, and the like including at least part of the above configuration. Note that each of the above means and processes may be combined with each other to the extent possible in accordance with embodiments or alternative embodiments.

According to one or more embodiments, it may be possible to realize a guide light irradiation function of an optical interference measurement apparatus at low cost without incurring an increase in size of the apparatus.

DETAILED DESCRIPTION

Application Example

Figure 1:
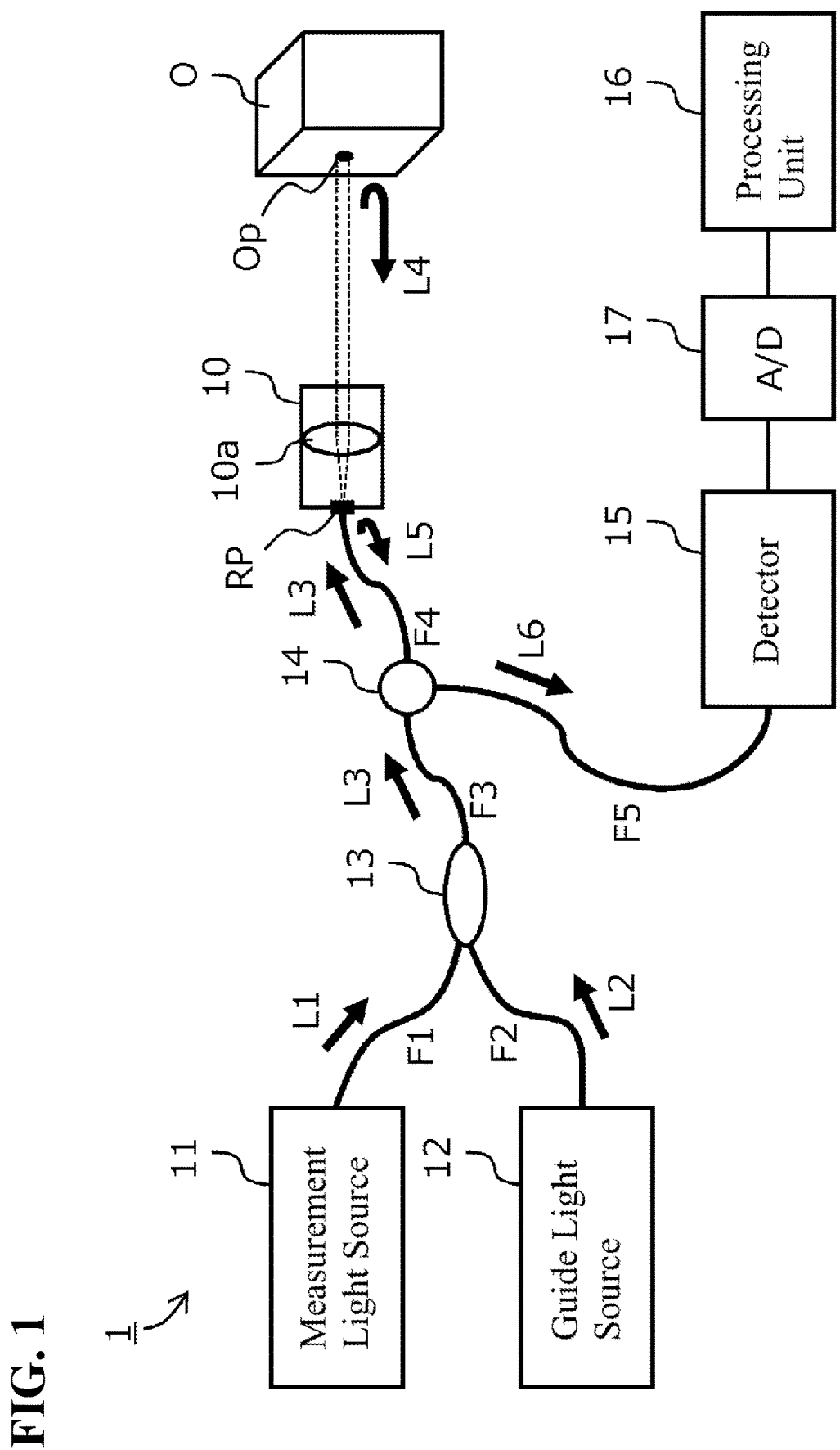
FIG. 1 is a schematic diagram illustrating a basic configuration of an optical interference measurement apparatus.

Hereinafter, an example of a basic configuration and operations of an optical interference measurement apparatus in accordance with one or more embodiments is applied will be described with reference to FIG. 1.

An optical interference measurement apparatus 1 is an apparatus for measuring a distance, speed, or oscillation of a measurement object O by using optical interference. The optical interference measurement apparatus 1 is constituted mainly including a measurement head (measurement unit) 10, a measurement light source 11 (first light source) for outputting measurement light L1, a guide light source 12 (second light source) for outputting guide light L2, a fiber coupler 13, a circulator 14, a detector 15, a processing unit 16, an AD converter 17, and optical fibers F1 to F5. Although a Fizeau interferometer is used as an example here, a Mach-Zehnder interferometer, a Michelson interferometer, or another type of interferometer may also be used. Light that has a wavelength in the infrared range is used for the measurement light L1, and light that has a wavelength in the visible range is used for the guide light L2.

When the measurement light L1 is input to the fiber coupler 13 via the optical fiber F1 and the guide light L2 is input to the fiber coupler 13 via the optical fiber F2, combined light L3 formed by combining the measurement light L1 and the guide light L2 with each other is output by the fiber coupler 13. The combined light L3 is guided to the measurement head 10 via the optical fiber F3, the circulator 14, and the optical fiber F4, and is projected from the measurement head 10 onto the measurement object O. With the above described configuration, since the same position is irradiated with the measurement light L1 and the guide light L2, due to a spot (light spot) Op that appears on the surface of the measurement object O, the measurement position (position irradiated with the measurement light L1) can be visually confirmed.

The light that is reflected from the measurement object O and is received by the measurement head 10 is guided to the optical fiber F4 as return light L4. On the other hand, part of the combined light L3 is reflected from a reference surface RP and guided to the optical fiber F4 as reference light L5. Then, an interference signal (beat signal) L6 of the return light L4 and the reference light L5 is guided to the detector 15 via the circulator 14, is subjected to a photoelectric conversion, and thereafter, is input to the processing unit 16 via the AD convertor 17. The interference signal L6 includes a frequency component corresponding to a difference in optical path length between the return light L4 and the reference light L5, that is, a distance to the measurement object O. Accordingly, by performing frequency analysis on the interference signal L6 with the processing unit 16, information such as distance, speed, oscillation of the measurement object O can be obtained.

Here, it is favorable to use a single mode fiber coupler, as the fiber coupler 13, formed by a single mode fiber that has a cutoff wavelength that is shorter than the wavelength of the measurement light L1 and longer than the wavelength of the guide light L2. By using a single mode fiber coupler, the means for synthesizing the measurement light L1 and the guide light L2 can be realized at low cost. Note that, although the guide light L2 is transferred in a multi-mode, measurement of the distance and the like is not influenced by that, and thus there is no problem in particular.

Hereinafter, specific configuration examples of the optical interference measurement apparatus 1 will be illustrated. In the drawings of the configuration examples, parts corresponding to the basic configuration in FIG. 1 are given the same reference numerals.

First Embodiment

Figure 2:
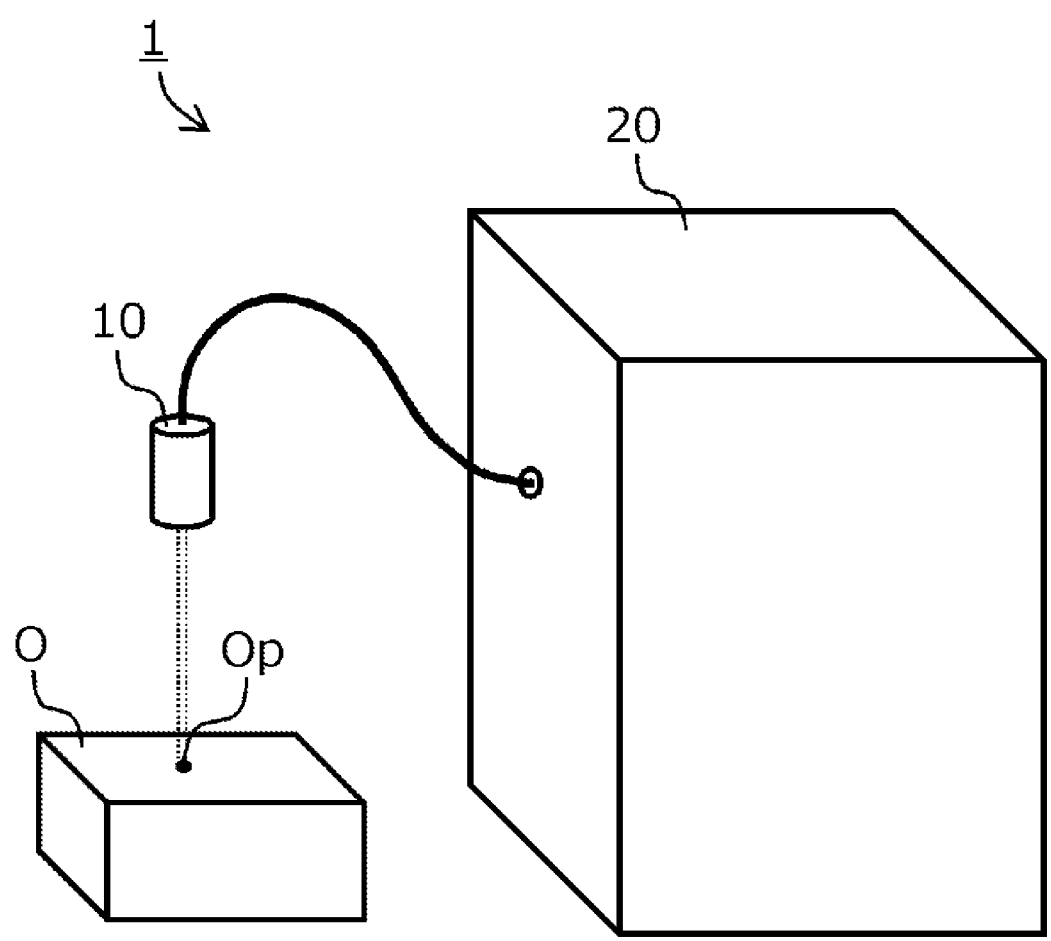
FIG. 2 is a schematic diagram illustrating the outer appearance of an optical interference measurement apparatus.
Figure 3:
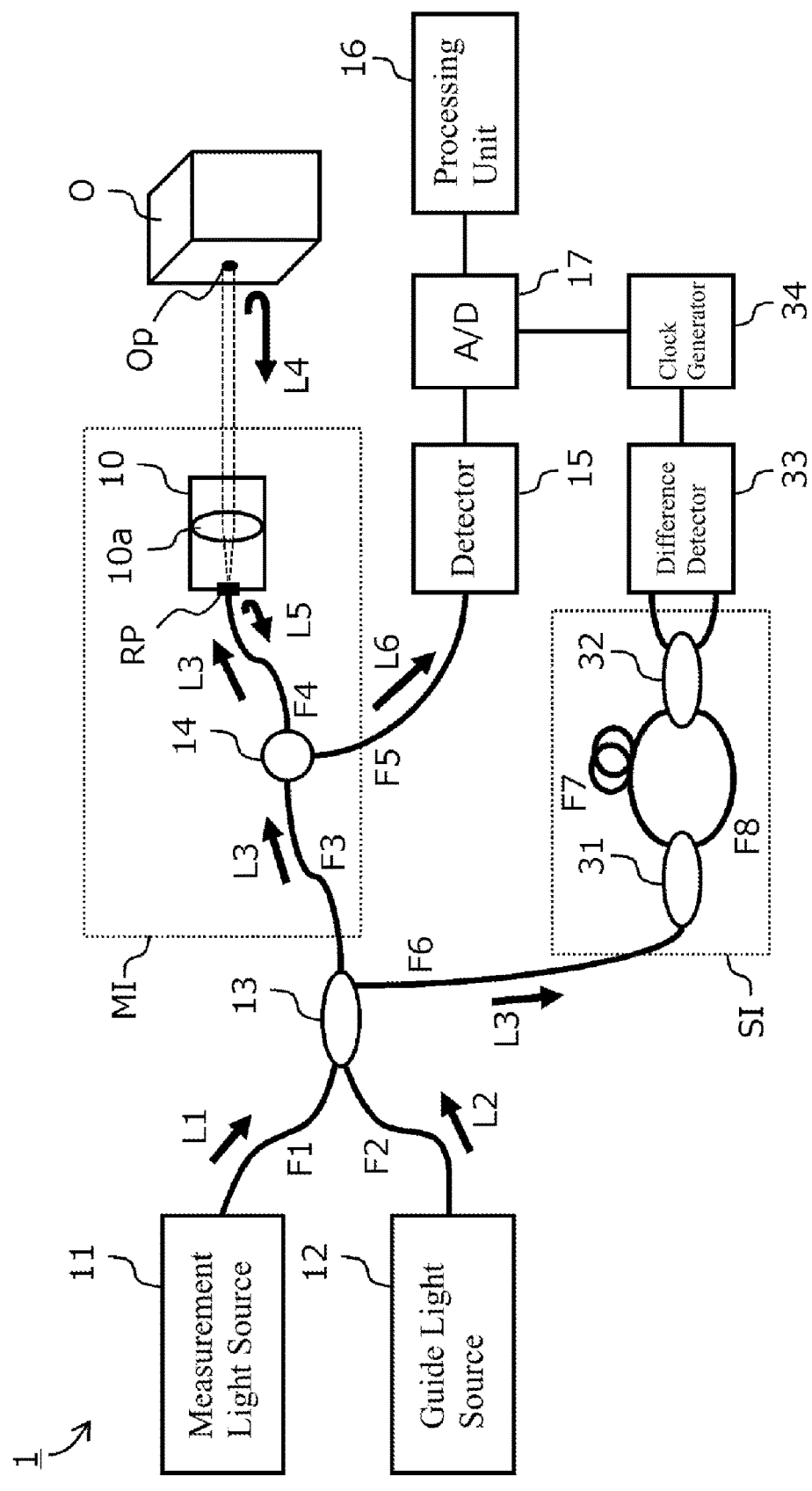
FIG. 3 is a schematic diagram illustrating a configuration of an optical interference measurement apparatus according to a first embodiment.

Now, the configuration of an optical interference measurement apparatus according to the first embodiment will be described with reference to FIG. 2 and FIG. 3. FIG. 2 is a schematic diagram illustrating the outer appearance of the optical interference measurement apparatus, and FIG. 3 is a schematic diagram illustrating the hardware configuration of the optical interference measurement apparatus.

The optical interference measurement apparatus 1 of the present embodiment is an apparatus for ranging the measurement object O by using a coherent FMCW (Frequency Modulated Continuous Wave). The optical interference measurement apparatus 1 generally includes a controller (apparatus main body) 20 and the measurement head 10, and irradiation with the measurement light and reception of the reflecting light are performed at the leading end of the measurement head 10. The controller 20 is constituted mainly including the measurement light source 11 for outputting the measurement light L1, the guide light source 12 for outputting the guide light L2, the fiber coupler 13, the circulator 14, the detector 15, the AD converter 17, the processing unit 16, fiber couplers 31 and 32, a difference detector 33, a clock generator 34, and optical fibers F1 to F10.

A Fizeau main interferometer MI is constituted by the circulator 14, the measurement head 10, and the optical fibers F3 and F5, and a subordinate interferometer SI is constituted by the fiber couplers 31 and 32, and the optical fibers F7 and F8. The main interferometer MI is an interferometer for measurement, and the subordinate interferometer SI is an interferometer for correcting the characteristics of the measurement light source 11.

The measurement light source 11 is a light source that is capable of outputting coherent measurement light L1, and uses a wavelength swept light source that is capable of temporally sweeping the wavelength of the measurement light L1 for the FMCW. Examples of the wavelength swept light source include a current modulation VCSEL, a MEMS-driven VCSEL and SSG-DBR, and the like, and any type of light source may be used. In the present embodiment, a current modulation VCSEL is used due to the advantage that it is low-cost. A near infrared laser having a wavelength of 1310 to 1550 nm is used as the measurement light L1, for example. Furthermore, although the wavelength sweeping is performed using a triangular wave in the present embodiment, the wavelength sweeping may also be performed using a sine wave, a sawtooth wave, or another waveform.

The guide light source 12 is a light source for outputting the guide light L2. Although any visible light can be used for the guide light regardless of its wavelength, red laser is used in the present embodiment. Red laser is used because the closer the wavelength of the measurement light L1 is to the wavelength of the guide light L2, the smaller the influence of chromatic aberration on the optical system of the measurement head 10 is. In addition, there is an advantage in that the light source of red laser is lower in costs compared to the light sources of the other colors.

The fiber coupler 13 has two inputs and two outputs. The measurement light L1 is input to a first port via the optical fiber F1, and the guide light L2 is input to a second port via the optical fiber F2. The combined light L3 formed by combining the measurement light L1 and the guide light L2 is output from a third port and a fourth port. The third port is connected to the optical fiber F3 on the main interferometer MI side, and the fourth port is connected to the optical fiber F6 on the subordinate interferometer SI side.

In the present embodiment, the single mode fiber coupler 13 formed by a single mode fiber that has a cutoff wavelength that is shorter than the wavelength of the measurement light L1 and longer than the wavelength of the guide light L2. It may be preferable that a coupling ratio (branch ratio) is set such that the coupling ratio of the path from the first port to the third port is at least 50%. By increasing the ratio of the measurement light L1 that branches toward the main interferometer MI, the power of the measurement light L1 that is projected on the measurement target O can be strengthened and the measurement accuracy can be improved.

The circulator 14 is a fiber component that has a function of outputting the light that is input by the optical fiber F3 to the optical fiber F4, and outputting the light that is input by the optical fiber F4 to the optical fiber F5. A fiber coupler may also be used instead of the circulator 14.

The measurement head 10 is a unit for performing irradiation of the measurement object O with the combined light L3, and reception of the light reflected from the measurement object O. The measurement head 10 has a structure in which an optical system 10a is provided inside a lens barrel shaped like a cylinder having a diameter of approximately 1.5 cm and a length of approximately 3 cm or a rectangular tube, for example. The optical system 10a may be a collimated lens for projecting a parallel beam, or a light-collecting lens for converging the beam at the measurement position on the measurement object O. A lens in which chromatic aberration is corrected (also referred to as "achromatic lens") may be used for the optical system 10a. Since the wavelength of measurement light L1 and the wavelength of the guide light L2 are different from each other, if a lens having a large chromatic aberration is used, the two light beams are displaced from each other, and the spot of the guide light L2 may not accurately indicate the measurement position. By using a lens in which chromatic aberration is corrected, displacement between the two light beams can be as small as possible, and accuracy of the projection position of the guide light L2 can be ensured.

The reference surface RP is provided on an optical path between the circulator 14 and the measurement head 10. The reference surface RP is a structure for forming the referent light L5 by reflecting part of the combined light L3. With the above described configuration, since the optical paths of the reference light L5 and the measurement light (return light L4) can be formed by the same optical fiber, the influence of temperature changes or oscillations can be offset, and thus robustness can be improved.

If the amount of the reference light L5 is large, the SN ratio becomes worse due to noise that increases in accordance with the amount of signals, such as shot noise. Therefore, the reflectance ratio of the reference surface RP is preferably less than 50%, and more preferably 10% or less. The method of forming the reference surface RP is not particularly limited. The reference surface RP may also be formed by, for example, vapor deposition of a partially reflective mirror on the end face of the optical fiber F4. Alternatively, the end surface of the optical fiber F4 may be set to a flat surface that is perpendicular to the optical axis, an air layer or a region filled with a refractive index matching material is formed between the optical fiber F4 and the measurement head 10, and Fresnel reflection that occurs on the boundary face of the refractive index may also be used. Alternatively, reflection on the lens surface in the optical system 10a of the measurement head 10 may also be used.

The return light L4 that is reflected from the measurement object O and received by the measurement head 10 and the reference light L5 that is reflected from the reference surface RP have a phase difference that corresponds to twice the optical path length from the reference surface RP to the measurement object O. Accordingly, the return light L4 and the reference light L5 interfere with each other on the reference surface RP, and an interference signal (beat signal) L6 having a frequency component corresponding to the phase difference is generated. The interference signal L6 is guided to the detector 15 via the circulator 14.

The detector 15 is photoelectric conversion element for converting the interference signal L6 that is input by the optical fiber F5 to an electric signal. The AD converter 17 converts the electric signal obtained by the detector 15 to a digital signal. Sampling is performed by the AD converter 17 in accordance with the clock signals supplied from the clock generator 34.

The processing unit 16 is a unit that performs frequency analysis on the interference signal thus AD-converted, and calculates the distance, speed, and oscillation (hereinafter collectively called "distance information") regarding the measurement object O. The processing unit 16 is constituted by, for example, an operation processing device including a processor and a memory. A general-purpose processor such as a CPU (Central Processing Unit) or an MPU (Micro Processing Unit), or a dedicated processor such as an FPGA (Field-Programmable Gate Array) or an ASIC (Application Specific Integrated Circuit) may also be used as the processor. Although not shown in the figures, information such as distance, speed, and oscillation, which is the result of operation by the processing unit 16, is output to an external apparatus (e.g., PLC (Programmable Logic Controller), a robot, an inspection apparatus, or a host computer) and used for controlling FA equipment, various inspections, and the like.

The fiber couplers 31 and 32 are single mode fiber couplers having a coupling ratio of 50%. A subordinate interferometer SI is constituted by providing a predetermined difference in optical path length between the optical fiber F7 and the optical fiber F8. The combined light L3 that is input to the subordinate interferometer SI from the optical fiber F6 is branched by the fiber coupler 31, and thereafter the resultant lights beams are combined with each other by the fiber coupler 32. The light that passes through the optical fiber F7 and the light that passes through the optical fiber F8 interfere with each other in the fiber coupler 32, and signals, in which the interference signals in the opposite phases are respectively superimposed on a triangular wave, are output from two output port of the fiber coupler 32. A difference detector 33 (also called a "balanced photodetector") converts the signals output by the subordinate interferometer SI to electric signals, and outputs the difference between the two signals. The triangular wave and laser noise between the two signals thereby offset each other, the interference signal component is amplified, and thus the interference signal having a good SN ratio can be obtained. The clock generator 34 is a circuit that generates a clock signal from a zero-crossing time of the interference signal obtained by the difference detector 33.

It is ideal that change (inclination) in the wavelength over time is linear when sweeping the wavelength of the measurement light by the measurement light source 11. If the wavelength sweeping is not linear, the beat frequency of the interference signal is not constant, which deteriorates ranging accuracy. However, in actuality, it is difficult to linearly sweep the wavelength. Also, the degree to which the wavelength is separated from linear shape depends on the individual characteristics of the measurement light source, and therefore it is difficult to correct the wavelength in advance.

In the present embodiment, in order to correct the non-linearity of the wavelength sweeping of the measurement light source 11, as described above, a sampling clock of the AD converter 17 is generated by using the subordinate interferometer SI. Since the sampling clock is generated from the measurement light that was actually output from the measurement light source 11, the sampling clock is formed by clock signals at unequal intervals in accordance with the inclination of the wavelength sweeping of the measurement light. By sampling the interference signals of the main interferometer MI at unequal intervals using the sampling clock, a result that is equivalent to that of sampling at equal interval phases can be obtained. Accordingly, reliability of frequency analysis and ranging accuracy can be improved.

Note that, another method for correcting non-linearity of the wavelength sweeping may also be used. For example, the interference signals at equal interval phases may also be generated by the processing unit 16 estimating the inclination (non-linearity) of the wavelength sweeping, based on the interference signals of the subordinate interference signal SI, and interpolating the interference signals of the main interferometer MI that are sampled at equal intervals by the AD converter 17. Alternatively, the linearity of the measurement light that is output from the measurement light source 11 may also be ensured by giving the distortion in the opposite direction to the control signal for sweeping the wavelength of the measurement light source 11 in advance such that the control signal and the light source characteristics offset each other.

According to the above-described configuration, the measurement position can be visually confirmed by using the guide light projected on the measurement object, and thus convenience and reliability of the apparatus can be improved. Furthermore, by using a configuration in which the measurement light and the guide light are combined with each other by the single mode fiber coupler 13, and the combined light is guided to the measurement head 10, the controller 20 and the measurement head 10 can be readily made smaller. Furthermore, there is also an advantage in that a guide light irradiation function can be implemented at low cost compared to the case in which an expensive fiber component such as a WDM coupler is used.

Second Embodiment

Figure 4:
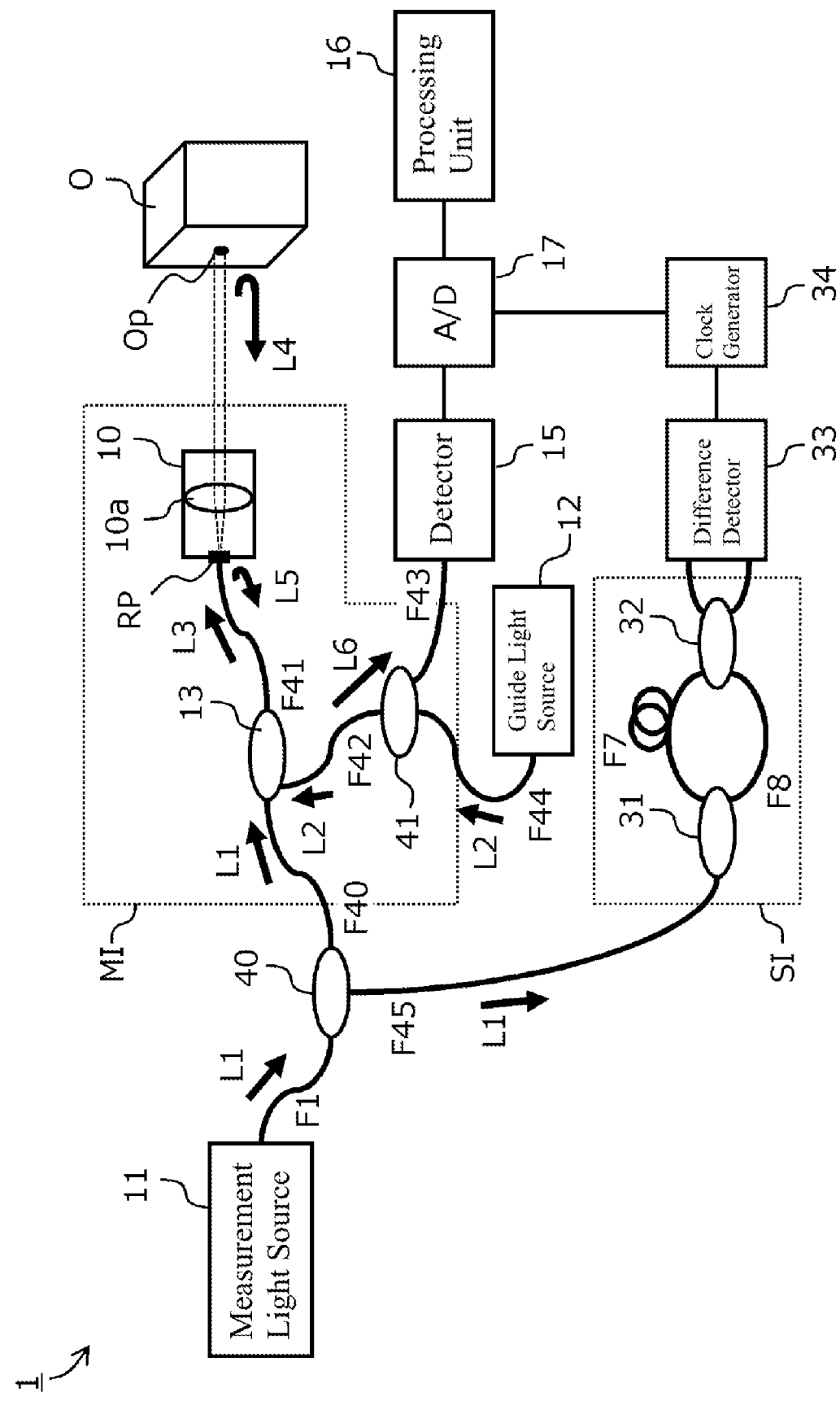
FIG. 4 is a schematic diagram illustrating a configuration of an optical interference measurement apparatus according to a second embodiment.

FIG. 4 shows an optical interference measurement apparatus according to a second embodiment. Although the second embodiment is a configuration example that also uses a Fizeau interferometer, the arrangement of the guide light source 12 is different from the first embodiment. The following description focuses on differences from the first embodiment.

The measurement light source 11 is connected to the fiber coupler 40. The measurement light L1 is branched by the fiber coupler 40, and the resultant light beams are respectively guided to the main interferometer MI via the optical fiber F40, and the subordinate interferometer SI via the optical fiber F45.

The guide light source 12 is connected to the fiber coupler 41. The guide light L2 is guided to the fiber coupler 13 via the optical fiber F44, the fiber coupler 41, and the optical fiber F42.

The fiber coupler 13 is the same as the fiber coupler 13 of the first embodiment (FIG. 3) except that the fourth port is not provided. The measurement light L1 is input to the first port via the optical fiber F40, and the guide light L2 is input to the second port via the optical fiber F42. Then, the combined light L3 formed by combining the measurement light L1 and the guide light L2 with each other is output by the third port. The combined light L3 is guided to the measurement head 10 via the optical fiber F41.

The interference signal L6 of the return light L4 and the reference light L5 is guided to the detector 15 via the fiber coupler 13, the optical fiber F42, the fiber coupler 41, and the optical fiber F43.

With the above configuration as well, the operations and effects equivalent to the first embodiment can be achieved.

Third Embodiment

Figure 5:
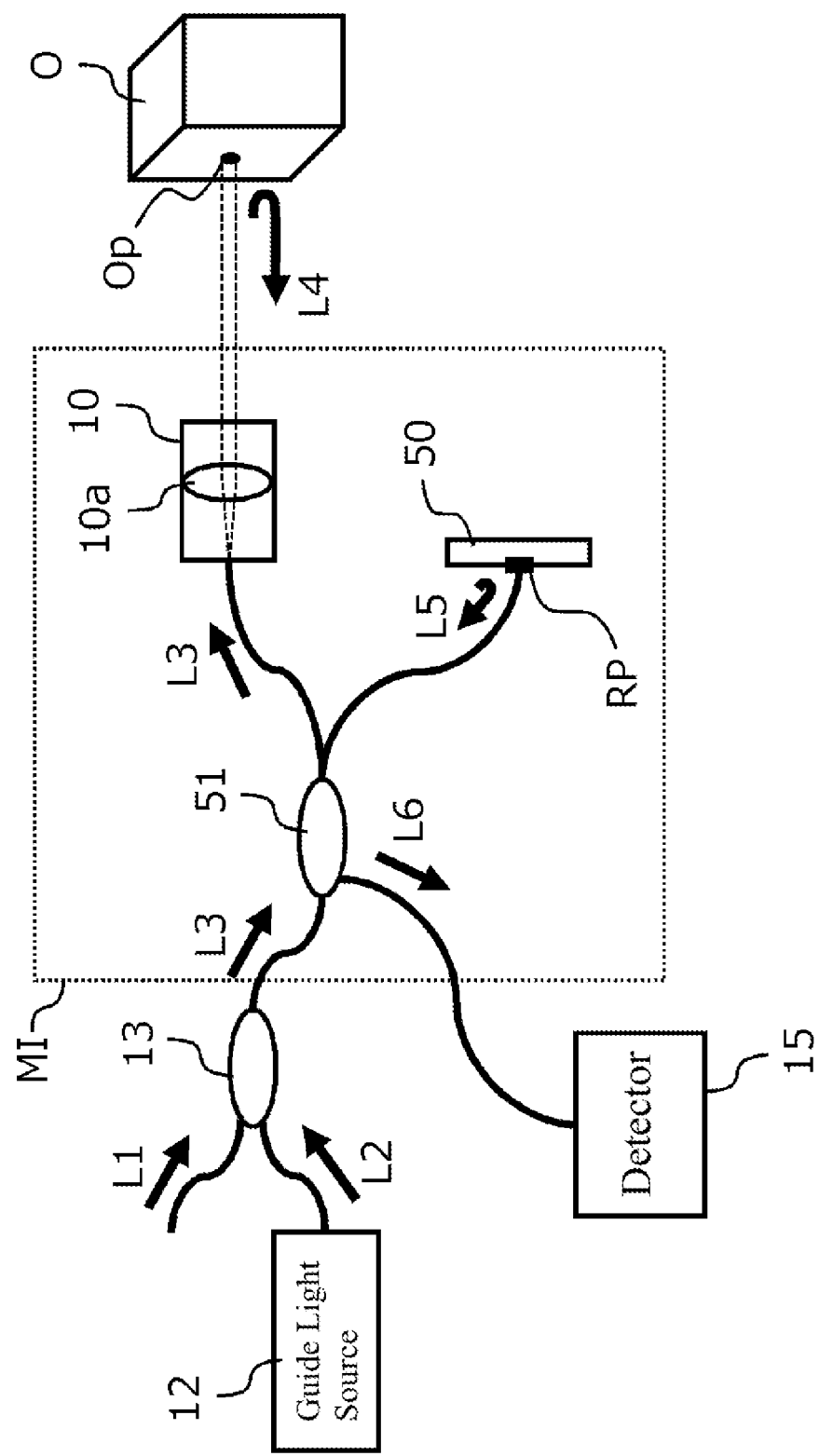
FIG. 5 is a schematic diagram illustrating a configuration of an optical interference measurement apparatus according to a third embodiment.

FIG. 5 shows a relevant portion of an optical interference measurement apparatus according to a third embodiment. The third embodiment is different from the above configuration examples in that a Michelson interferometer is used for the main interferometer MI. In the configuration examples shown in FIG. 1 to FIG. 4, the reference surface RP is formed at the end face of the optical fiber connected to the measurement head 10, but in contrast, in the configuration example in FIG. 5, the reference surface RP is formed by the reflector 50. In the above described configuration, the combined light L3 that is branched by the fiber coupler (branching device) 51 provided on the optical path between the fiber coupler 13 and the measurement head 10 and is reflected from the reflector 50 is used as the reference light L5. The return light L4 from the measurement head 10 and the reference light L5 from the reflector 50 interfere with each other in the fiber coupler 51, and the interference signal L6 that is output from the fiber coupler 51 is guided to the detector 15.

Figure 6:
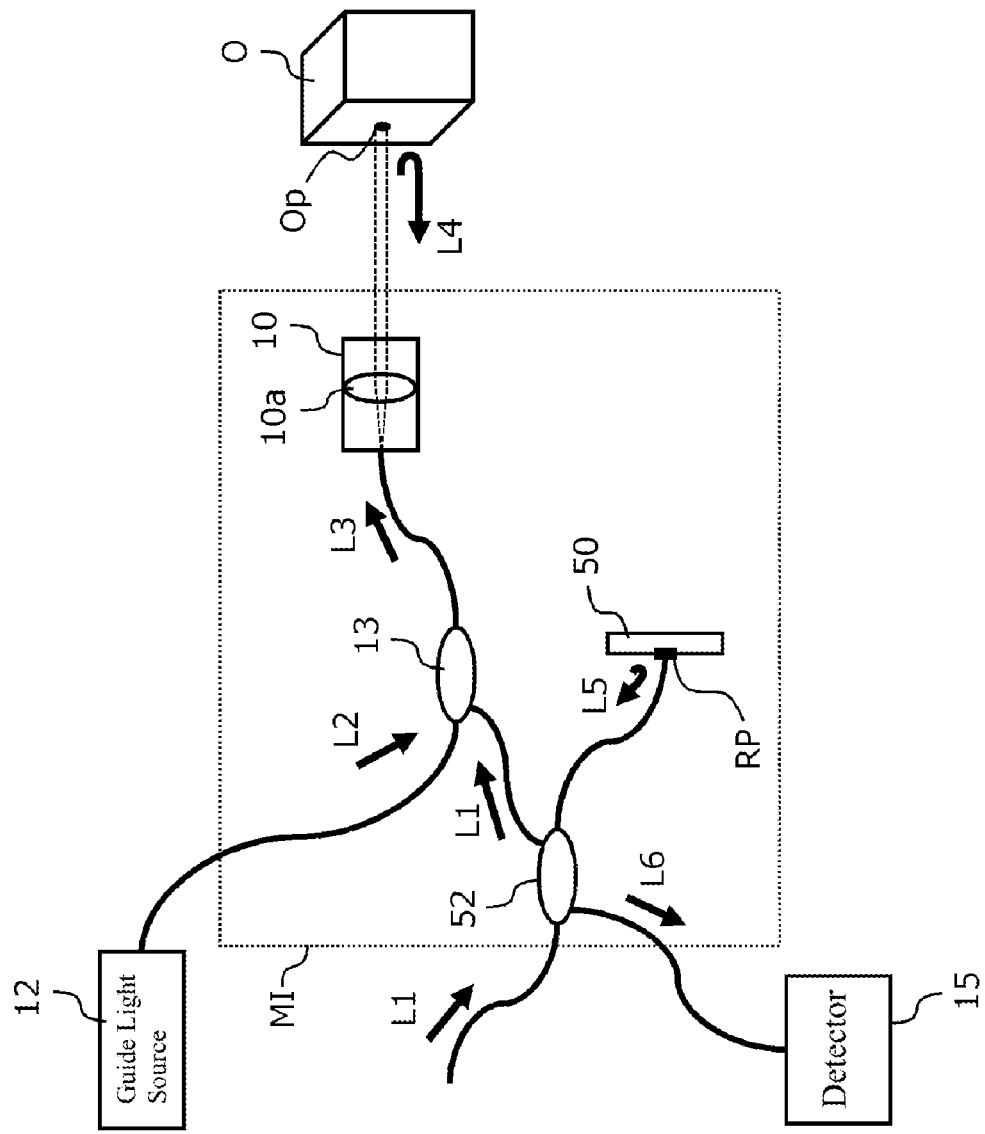
FIG. 6 is a schematic diagram illustrating a variation of an optical interference measurement apparatus according to a third embodiment.
Figure 7:
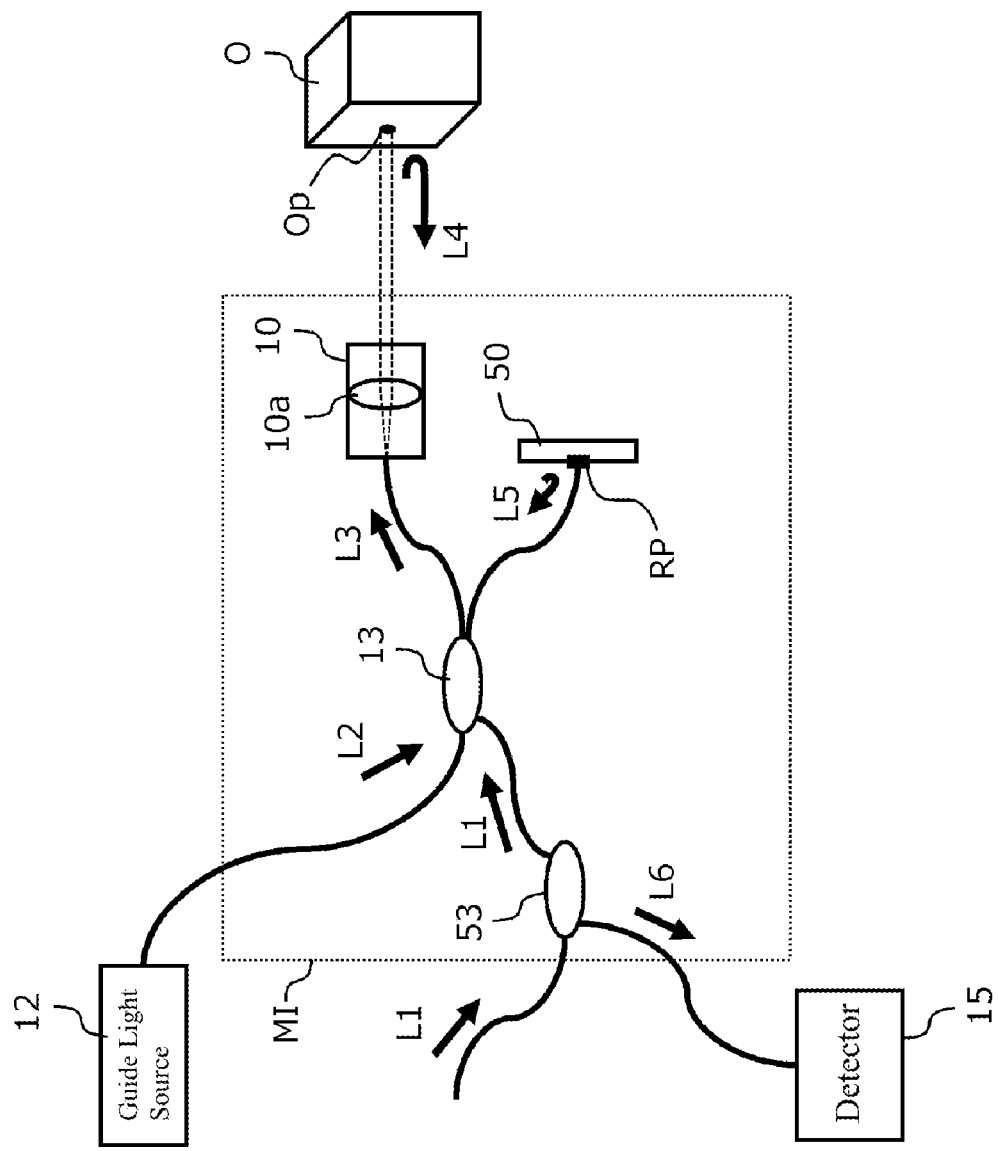
FIG. 7 is a schematic diagram illustrating another variation of an optical interference measurement apparatus according to a third embodiment.

FIG. 6 and FIG. 7 shows variations of the third embodiment. In the configuration in FIG. 6, in the Michelson main interferometer MI, part of the measurement light L1 is branched by the fiber coupler 52 (branching device) provided on the optical path between the measurement light source 11 and the fiber coupler 13, and the resultant light beam is used as the reference light L5. In the configuration in FIG. 7, the combined light L3 formed by combining the lights by the fiber coupler 13 is output from the third port and the fourth port, and the combined light L3 from the third port is used for measurement, and the combined light from the fourth port is used as the reference light L5.

With the above described configuration as well, the operations and effects equivalent to the previously described embodiments can be achieved.

Fourth Embodiment

Figure 8:
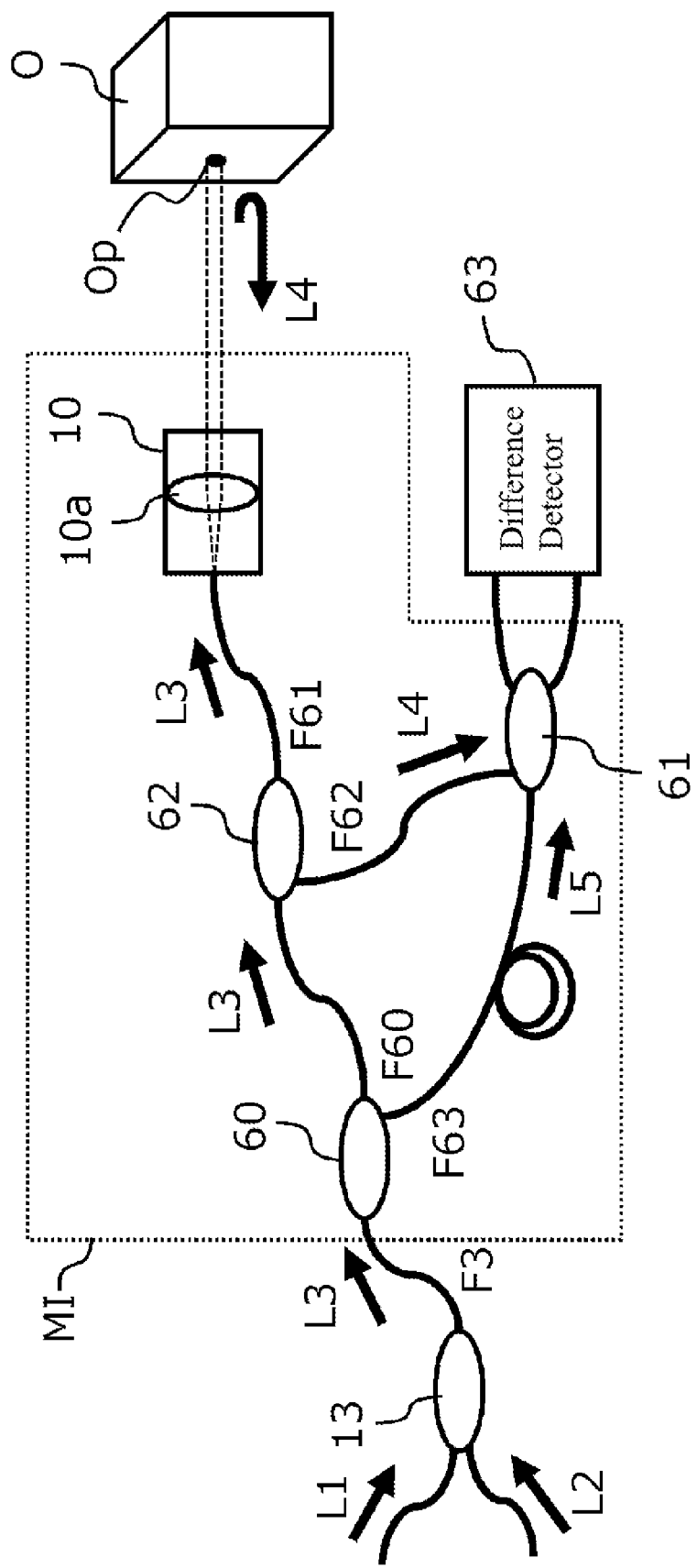
FIG. 8 is a schematic diagram illustrating a configuration of an optical interference measurement apparatus according to a fourth embodiment.

FIG. 8 shows the relevant part of an optical interference measurement apparatus according to a fourth embodiment. The fourth embodiment is different from the above configuration examples in that a Mach-Zehnder interferometer is used as the main interferometer MI.

The main interferometer MI includes fiber couplers 60, 61, and 62, and optical fibers F60 to F63. The main interferometer MI also includes a difference detector 63 instead of the detector 15 of the above configuration examples.

The combined light L3 that is input via the optical fiber F3 is branched by the fiber coupler 60 (branching device), and the resultant light beams are respectively guided to the optical fibers F60 and F63. The combined light L3 that is branched into the optical fiber F60 is guided to the measurement head 10 via the fiber coupler 62 and the optical fiber F61, and projected on the measurement object O. The return light L4 that is reflected from the measurement object O is input to the fiber coupler 61 from the measurement head 10 via the optical fiber F61, the fiber coupler 62, and the optical fiber F62. On the other hand, the combined light that is branched into the optical fiber F63 is input to the fiber coupler 61 as reference light L5. Thereafter, the return light L4 and the reference light L5 interfere with each other in the fiber coupler 61, and the signals in which the interference signals in the opposite phases are superimposed on the triangular wave are output from the two output ports of the fiber coupler 61. The difference detector 63 converts the signals that are output from the main interferometer MI into the electric signals, and outputs the difference between the two signals. With the above described operation, the interference signal having a good SN ratio can be obtained.

Figure 9:
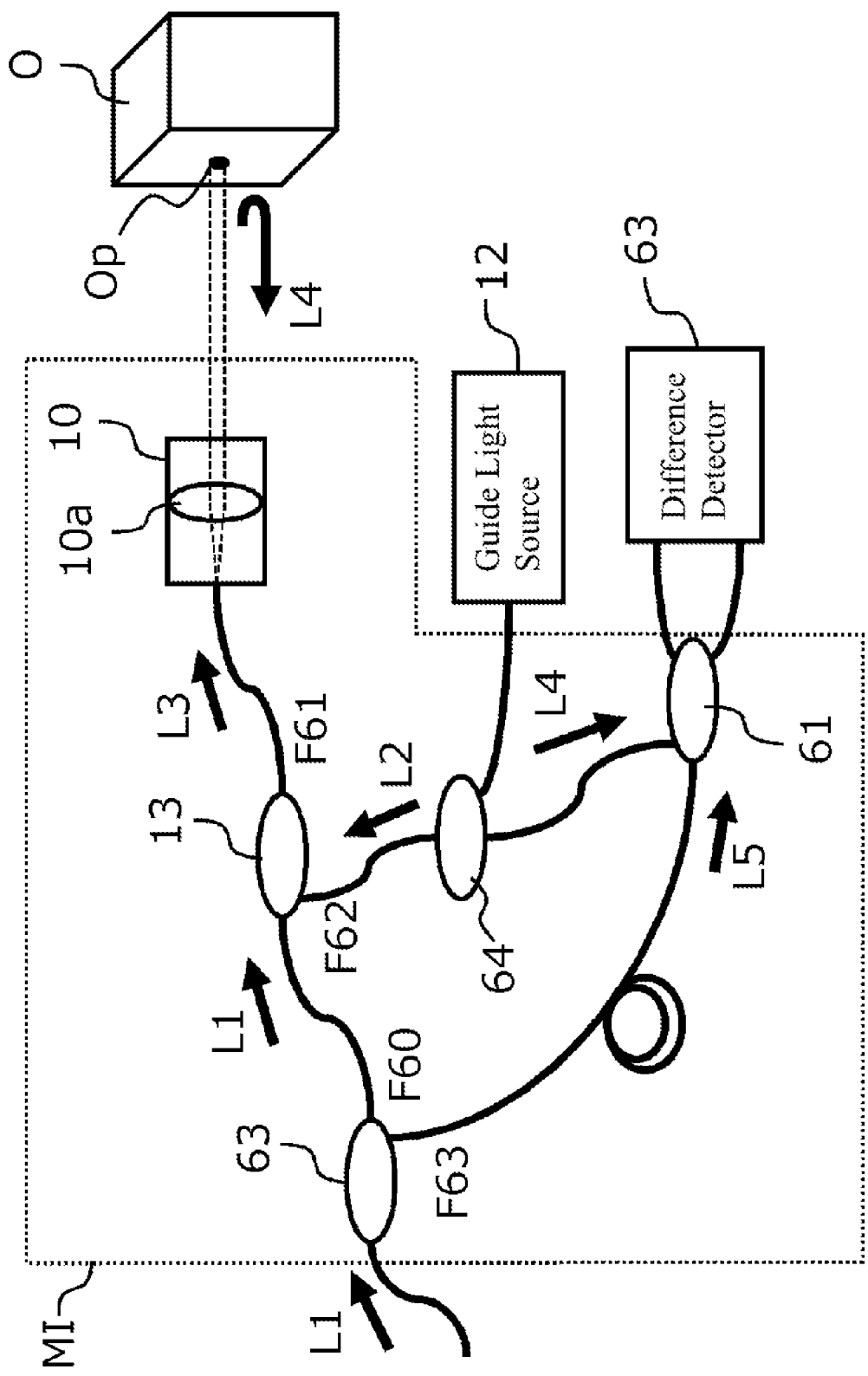
FIG. 9 is a schematic diagram illustrating a variation of an optical interference measurement apparatus according to a fourth embodiment.

FIG. 9 shows a variation of the fourth embodiment. In the configuration in FIG. 9, in the Mach-Zehnder main interferometer MI, part of the measurement light L1 is branched by the fiber coupler 63 (branching device) provided on the optical path between the measurement light source 11 and the fiber coupler 13, and the resultant light beam is used as the reference light L5. The guide light source 12 is connected to the fiber coupler 64, the guide light L2 is input to the fiber coupler 13 via the fiber coupler 64 and the optical fiber F62, and is combined with the measurement light L1.

Figure 10:
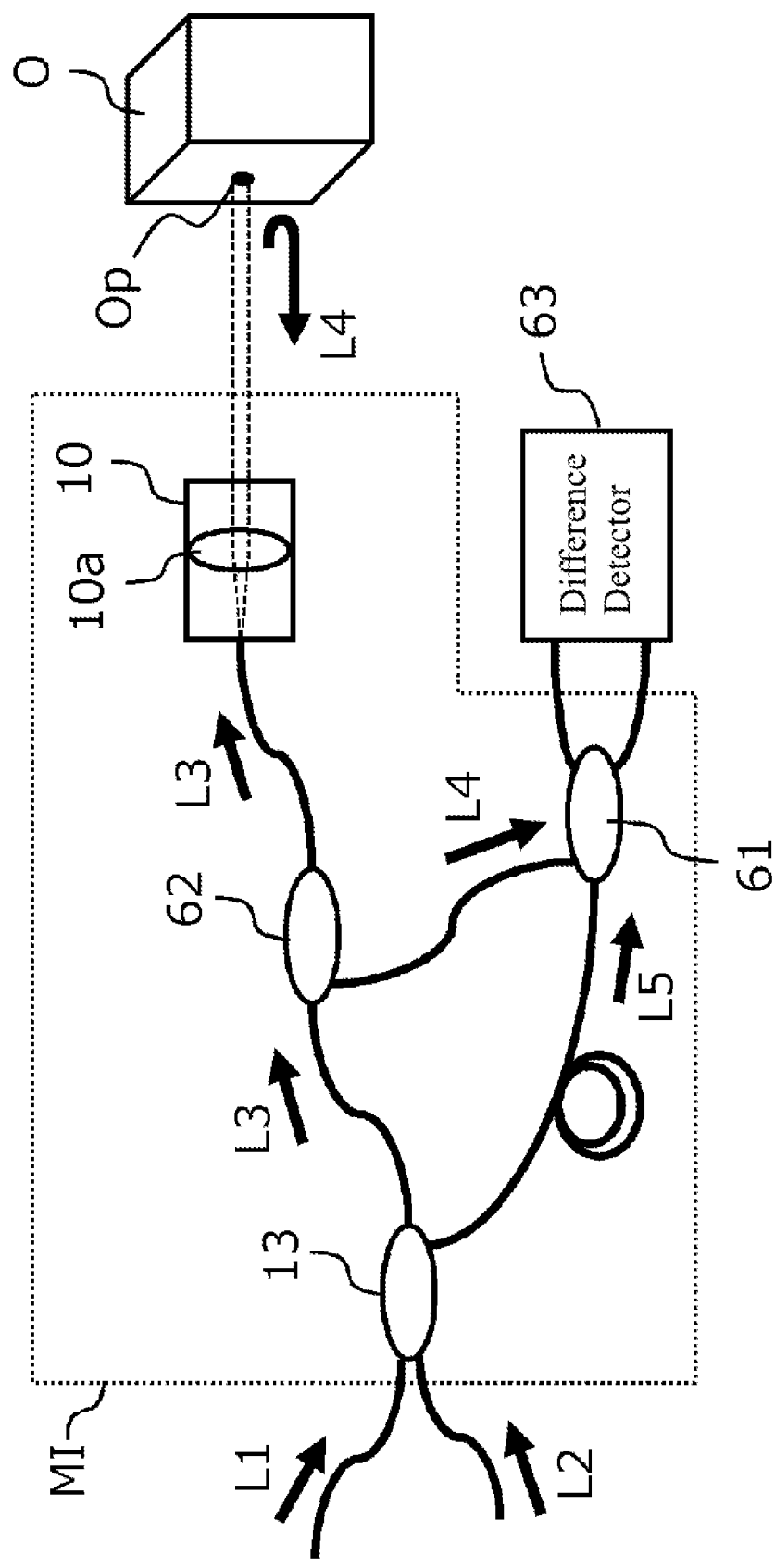
FIG. 10 is a schematic diagram illustrating another variation of an optical interference measurement apparatus according to a fourth embodiment.

FIG. 10 shows another variation of the fourth embodiment. In the configuration in FIG. 10, the combined light L3 formed by combining the lights by the fiber coupler 13 is output from the third port and the fourth port, and the combined light L3 from the third port is used for measurement, and the combined light from the fourth port is used as the reference light L5.

With the above configuration as well, the operations and effects equivalent to the previously described embodiments can be achieved.

Further Considerations

The above embodiments are merely exemplifications. The invention is not limited to the specific embodiments described above, and various modifications are possible within the technical scope thereof. For example, the configuration of the subordinate interferometer SI shown in FIG. 3 and FIG. 4 may also be combined with the main interferometer MI in FIG. 5 to FIG. 10 as appropriate.

Note 1 An optical interference measurement apparatus may include:

a first light source that is configured to output measurement light that has a wavelength in an infrared range;

a second light source that is configured to output guide light that has a wavelength in a visible range;

a fiber coupler that includes at least a first port into which the measurement light is input, a second port into which the guide light is input, and a third port that outputs combined light formed by combining the measurement light and the guide light with each other;

a measurement unit that is configured to emit the combined light to a measurement object and receive return light that is reflected from a measurement object; and a processing unit that is configured to obtain information relating to a distance, a speed, or an oscillation of the measurement object, based on an interference signal of the return light and the reference light, wherein the fiber coupler is formed by a single mode fiber that has a cutoff wavelength that is shorter than the wavelength of the measurement light and longer than the wavelength of the guide light.

The invention claimed is:

1. An optical interference measurement apparatus for factory automation comprising:

a first light source that outputs measurement light that has a wavelength in an infrared range;

a second light source that outputs guide light that has a wavelength in a visible range;

a first fiber coupler that comprises at least a first port into which the measurement light is input, a second port into which the guide light is input, and a third port and a fourth port that output combined light formed by combining the measurement light and the guide light with each other;

a measurement head that emits the combined light to a measurement object and receives return light that is reflected from the measurement object;

a subordinate interferometer that receives the combined light output by the fourth port of the first fiber coupler, branches the combined light into paths having a predetermined difference in path length, and combines the branched combined light to generate an output signal;

a processor configured to perform operations comprising calculating a distance, a speed, or an oscillation of the measurement object, based on an interference signal of the return light and a reference light, wherein the first fiber coupler is formed by a single mode fiber that has a cutoff wavelength that is shorter than the wavelength of the measurement light and longer than the wavelength of the guide light, the optical interference measurement apparatus further comprises a clock generator comprising a circuit which generates a clock signal based on the generated output signal of the subordinate interferometer, and the interference signal is sampled according to the generated clock signal for processing by the processor, the generated clock signal being generated at unequal intervals in accordance with change in the wavelength over time of wavelength sweeping of the measurement light.

2. The optical interference measurement apparatus according to claim 1,
wherein a coupling ratio of a path from the first port to the third port of the first fiber coupler is at least 50%.

3. The optical interference measurement apparatus according to claim 2, wherein the first light source is a wavelength swept light source.

4. The optical interference measurement apparatus according to claim 3,
wherein the guide light is red light.

5. The optical interference measurement apparatus according to claim 2, wherein the guide light is red light.

6. The optical interference measurement apparatus according to claim 2,
wherein the measurement head comprises an optical system in which chromatic aberration is corrected.

7. The optical interference measurement apparatus according to claim 2,
wherein the reference light is part of the combined light that is reflected from a reference surface positioned on an optical path between the third port of the first fiber coupler and the measurement head.

8. The optical interference measurement apparatus according to claim 7,
wherein the reference surface is an end face of an optical fiber that is connected to the measurement head.

9. The optical interference measurement apparatus according to claim 2,
wherein the reference light is light obtained by branching part of the measurement light by a branching device comprising a second fiber coupler positioned on an optical path between the first light source and the first port of the first fiber coupler.

10. The optical interference measurement apparatus according to claim 2,
wherein the reference light is light obtained by branching part of the combined light by a branching device comprising a second fiber coupler positioned on the optical path between the third port of the first fiber coupler and the measurement head.

11. The optical interference measurement apparatus according to claim 1,
wherein the first light source is a wavelength swept light source.

12. The optical interference measurement apparatus according to claim 11, wherein the guide light is red light.

13. The optical interference measurement apparatus according to claim 1,
wherein the guide light is red light.

14. The optical interference measurement apparatus according to claim 1,
wherein the measurement head comprises an optical system in which chromatic aberration is corrected.

15. The optical interference measurement apparatus according to claim 1,
wherein the reference light is part of the combined light that is reflected from a reference surface positioned on an optical path between the third port of the first fiber coupler and the measurement head.

16. The optical interference measurement apparatus according to claim 15,
wherein the reference surface is an end face of an optical fiber that is connected to the measurement head.

17. The optical interference measurement apparatus according to claim 1,
wherein the reference light is light obtained by branching part of the measurement light by a branching device comprising a second fiber coupler positioned on an optical path between the first light source and the first port of the first fiber coupler.

18. The optical interference measurement apparatus according to claim 1,
wherein the reference light is light obtained by branching part of the combined light by a branching device comprising a second fiber coupler positioned on the optical path between the third port of the first fiber coupler and the measurement head.

* * * * *